C. F. HEINKEL & W. G. LUETERS.
AUTOMATIC COMBINATION TOOL HOLDER.
APPLICATION FILED SEPT. 13, 1909.
1,069,614.
Patented Aug. 5, 1913.
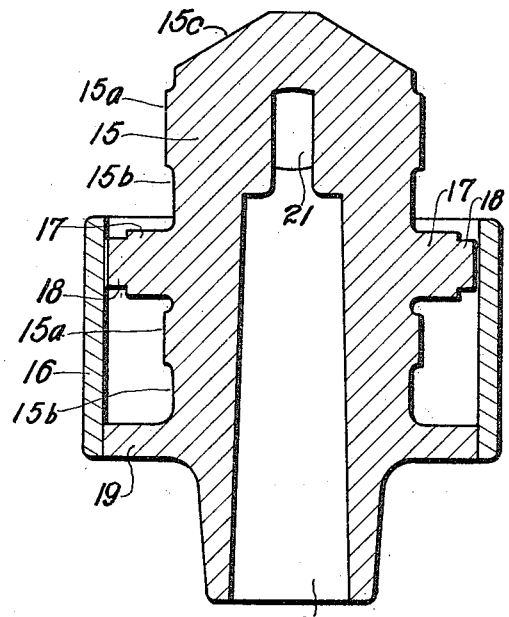
Fig. II
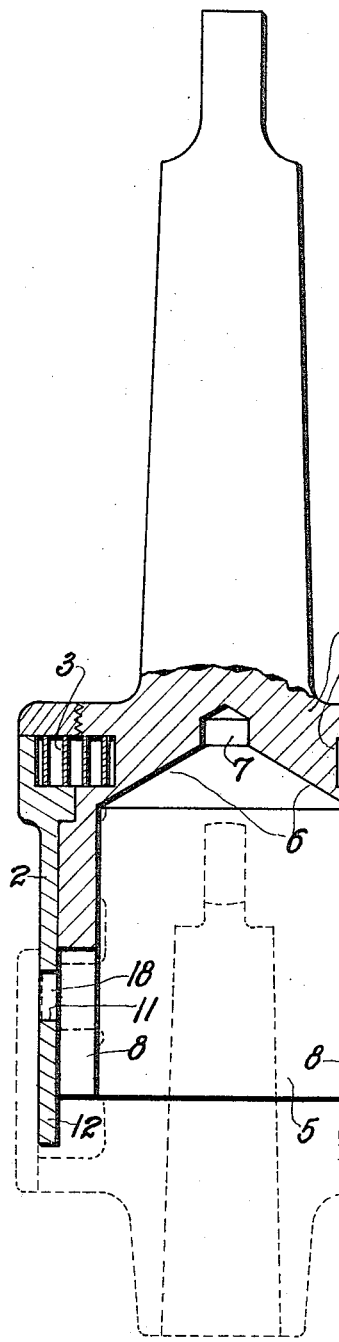
Fig. I
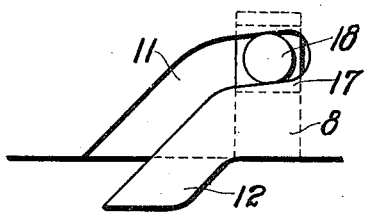
Fig. III
Witnesses:
Frank S. Smith
Henry R. Sydow
Inventors:
Christian F. Heinkel
William G. Lueters

UNITED STATES PATENT OFFICE.

CHRISTIAN F. HEINKEL AND WILLIAM G. LUETERS, OF CLEVELAND, OHIO.

AUTOMATIC COMBINATION TOOL-HOLDER.

1,069,614. Specification of Letters Patent. Patented Aug. 5, 1913.

Application filed September 13, 1909. Serial No. 517,512.

*To all whom it may concern:*

Be it known that we, CHRISTIAN F. HEINKEL and WILLIAM G. LUETERS, citizens of the United States, residing at Cleveland, in the county of Cuyahoga and State of Ohio, have invented a new and useful Improvement in Automatic Combination Tool-Holders, of which the following is a specification.

Our invention relates to improvements in automatic combination tool holders in which tools with a variety of shanks may be held as well as changed without stopping the machine in which said tools are used.

The object of our invention is a tool holder in which a tool with any shape of shank can be held automatically, and in which the changes of tools with either similarly or differently shaped shanks can be effected while the machine, in which said tools are used is in motion. We attain this object by the mechanism illustrated in the accompanying drawing, in which—

Figure I is a sectional view of a chuck with taper-shank holder shown in position in dotted lines. Fig. II is a section through center-line of a taper-shank tool-holder. Fig. III is a partial side-view of a chuck showing relation and contour of slots and projections.

Similar numerals refer to similar parts throughout the several views.

Our automatic combination tool holder consists, principally, of a chuck and one or more tool holders.

In carrying out our invention, we prefer to construct the chuck of a body 1, of sleeve 2, of spring 3, and of threaded collar 4.

Body 1 may have a taper shank as shown, or may have a straight shank, or may be the terminal or end of the spindle of a machine, as for instance a drill-press. Central opening 5, adapted to receive holder as will appear hereinafter, extends into body 1 some distance, and terminates in a conical end 6 and a clearance-opening 7 which is for the purpose of facilitating machining of conical end 6. Two longitudinal and diametrically opposite slots 8, extending part way up, are cut through the tubular portion of body 1 for the purpose of receiving and clearing the projections on the holders, as will appear hereinafter.

Sleeve 2 fits rotatably over tubular portion of body 1 and has an annular recess 9, coinciding with an annular and similar recess 9 in body 1, to receive spring 3. Step 10 is for the purpose of preventing sleeve 2 from moving down. Two slots 11, diametrically opposite, and, preferably, of the contour shown in Fig. III, are cut through the end of sleeve 2, to receive the projections of the holder, as will appear hereinafter. Two diametrically opposite projections 12 are provided on sleeve 2 for the purpose of catching the projections on the holders, as will appear hereinafter. The upper and enlarged portion of sleeve 2 is, preferably, knurled, the purpose of which will appear hereinafter.

Spring 3, preferably a flat coil spring as shown, but may be made of round or square wire, is placed in recess 9, and has its one end secured to pin 13 placed in body 1, while its other end is secured to pin 14 placed in sleeve 2.

Collar 4 has a central and threaded opening adapted to a threaded portion provided for that purpose on body 1, and is for the purpose of access to the spring 3, as well as preventing sleeve 2 from moving up. It will be seen that the step 10 and collar 4 prevent sleeve 2 from moving either way, longitudinally, while sufficient play can be allowed, by means of the thread, to allow sleeve 2 to move rotatably. A projection similar to projection 12 on sleeve 2, may be provided on one side of each slot 8 of body 1, to act as a stop for projection 17; said projections on body 1 need not be as large as projections 12, and may be omitted and the usual stop-pin and slot may be provided in sleeve 2 and body 1 respectively.

A holder, adapted for taper-shank tools, is shown dotted in position in Fig. I, and in section in Fig. II, and consists of a body 15 and a protection-sleeve 16.

The raised portions 15$^a$ of body 15 fit rotatably and slidingly into central opening 5 of the chuck (previously mentioned), and the recessed portions 15$^b$, although not necessary, may be provided, so that body 15 may bear at top and bottom only, thus permitting of a better fit. The upper portion of body 15 terminates in a conical face 15$^c$, to fit to, and bear against conical end 6 of central opening 5 when the holder is inserted in the chuck. Two diametrically opposite projections 17, preferably of square or rectangular cross-section, are provided on body 15 to engage in slots 8 of the chuck, and two projections 18, preferably of circular cross-section, are provided on projections 17 to engage slots 11 of the chuck. Flange 19 is for the purpose of receiving protection-sleeve 16. Central opening 20 is adapted to receive the usual or special taper-shank tools, and opening 21 is for the purpose of inserting the usual pin or key in order to remove said taper-shank tools from the holder. Protection-sleeve 16 is driven, or shrunk, or otherwise secured to flange 19, and extends upward far enough to cover projections 17, and 18, as well as slots 11. It may be noted here that in similar chucks now in use, the projections and slots are not protected and are dangerous to the operator.

The operation of the chuck is as follows: After the chuck is in position in the machine, the machine is started, and in order to insert a tool, for instance a taper-shank drill, place the drill in its proper holder, then insert and push said holder up into the central opening 5 which is provided for that purpose in body 1 of the chuck, as previously stated, until the projections 18 on the holder strike, or will be caught by projections 12 on sleeve 2, the holder will then begin to rotate, but if held back, or if friction is applied by means of the operator's hand holding protection-sleeve 16, which is knurled for that purpose, projection 18 will turn sleeve 2 backward, thus allowing projection 17 to find slot 8 and move up therein until conical face 15c abuts on conical end 6. The operator's hand is then removed from protection-sleeve 16, spring 3 will turn sleeve 2 forward and, by means of the lesser incline of slot 11, will press or wedge the holder upward and against said conical face, thus centering the holder as well as keeping it up in position. The driving of the holder with its drill is accomplished through projections 17 in slots 8, while the holder is held in position by means of projections 18 and slots 11. The contour of slots 11 is, preferably, of a compound incline, the lower portion being steeper than the upper portion, so that an upward movement is given to the holder, and a backward turning movement is given to sleeve 2 when caught on projections 12. The upper portion of slots 11 has less incline, so that a wedging action upward is produced on the holder.

In order to remove any holder from the chuck, apply friction, by means of the hand or otherwise, to the enlarged portion of sleeve 2 which is knurled for that purpose, sleeve 2 will then turn backward and, the upward pressure, which was caused by the lesser incline, being removed, the holder will fall out, or may be removed easily.

The operation of the taper-shank holders needs no particular explanation; the taper-shank tools are inserted in their respective holder and driven out by means of a key inserted in slot 21.

It should be noted that in the operations mentioned the machine or the machine and the chuck is supposed to be rotating, if not, or if a tool is to be inserted or removed while the holder is not in the chuck, the protection-sleeves must be turned backward in order to insert or remove a tool; otherwise the operations are similar to those previously mentioned or described.

It may further be noted that the conical end in central opening 5 of Fig. I, and the conical faces on the body of the several holders are not absolutely necessary and may be omitted, since the raised portions on the several bodies fit into said central opening and are centered thereby.

It may further be noted that, instead of slot 21 in body 15 of Fig. II, an opening may be provided in the end of said body and the taper-shank tools driven out therethrough.

It may further be noted that a recess may be cut into collar 4, and pin 14 made long enough to enter said recess so that a stop may be provided between body 1 and sleeve 2.

It will be seen that, with this invention, a change of tools can be effected without stopping the machine, thereby saving considerable time, and further, all dangerous projections, upon which the operator may be caught and injured are protected by our protection sleeve.

We claim:

1. In a combination tool holder the combination of a tool holder chuck with one or more tool holders; the said tool holder chuck having a body with a suitable shank at one end and a tubular portion at the other end, straight and longitudinal slots in the end of said tubular portion, a sleeve over the larger portion of said body, slots in said sleeve, and a spring operatively connected between said body and said sleeve; each of the said tool holders having a body adapted to enter into and center in said tubular portion of said chuck, projections on said body adapted to enter into said slots of said chuck and said sleeve, a flange on said body, a central opening in said body adapted to receive a tool shank, and a protection sleeve secured at one end to said flange and extending at the other end over said projections so as to cover said projections on the tool holder and said slots in the chuck when the tool holder is inserted in operative position in the chuck.

2. A tool holder chuck having a body with a suitable shank at one end and a larger tubular portion at the other end, the opening in said tubular portion being adapted to receive a tool holder and having a conical end adapted to center a tool holder, straight and longitudinal slots in the end of said tubular portion, a sleeve mounted rotatably upon said larger portion and having inclined slots in the end thereof, the sides of the lower or open portion of said inclined slots being inclined more toward the longitudinal than toward the transverse axis of said chuck to permit the driving projections on said tool holder to enter said slots readily, the sides of the upper portion of said inclined slots being inclined more toward the transverse than toward the longitudinal axis of said chuck for the purpose of exerting a wedging action upward against said driving projections and thereby holding said tool holder in position in said chuck, projections on said sleeve extending below the main body thereof and adjacent to said inclined slots and so disposed that the front face of said projections forms a continuation of the rear side of said inclined slots, and a spring having one end secured to said sleeve and the other end to said chuck for the purpose of forcing said sleeve rotatably forward to hold said tool holder in position in said chuck when said sleeve is in normal position, said spring being disposed to permit said sleeve to be rotated backward against the tension of said spring when inserting said holder into said chuck.

3. A tool holder having a body, driving projections on said body, a central opening in said body adapted to receive a tool shank, a conical end on said body to center said holder in a chuck, a flange on said body, a protection sleeve secured at one end to said flange and extending at the other end over said driving projections so as to cover said driving projections.

CHRISTIAN F. HEINKEL.
WILLIAM G. LUETERS.

Witnesses:
FRANK S. SMITH,
HENRY R. SYDON.

---

Copies of this patent may be obtained for five cents each, by addressing the "Commissioner of Patents, Washington, D. C."